May 8, 1951     T. GREENE     2,551,942
APPARATUS FOR LOCATING FAULTS IN ELECTRIC CIRCUITS
Filed May 26, 1950     2 Sheets-Sheet 1

May 8, 1951 T. GREENE 2,551,942
APPARATUS FOR LOCATING FAULTS IN ELECTRIC CIRCUITS
Filed May 26, 1950 2 Sheets-Sheet 2

Inventor
Thomas Greene
by Abraham W. Prasser
attorney

Patented May 8, 1951

2,551,942

UNITED STATES PATENT OFFICE 2,551,942

APPARATUS FOR LOCATING FAULTS IN ELECTRIC CIRCUITS

Thomas Greene, Willesden, England

Application May 26, 1950, Serial No. 164,373
In Great Britain November 29, 1947

3 Claims. (Cl. 175—183)

1

The present invention relates to improved apparatus for locating the position of faults, such as a short circuit or a break in an electric conductor.

Objects of the present invention are to provide an apparatus which will measure the position of faults in cables of a variety of lengths with substantially the same accuracy and which will give a direct reading of the position of character of such faults.

Figure 1:
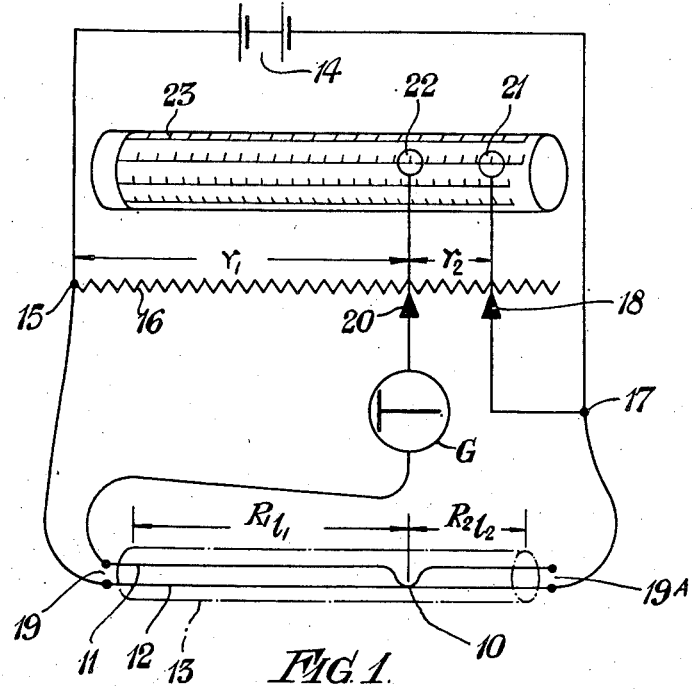
Figure 2:
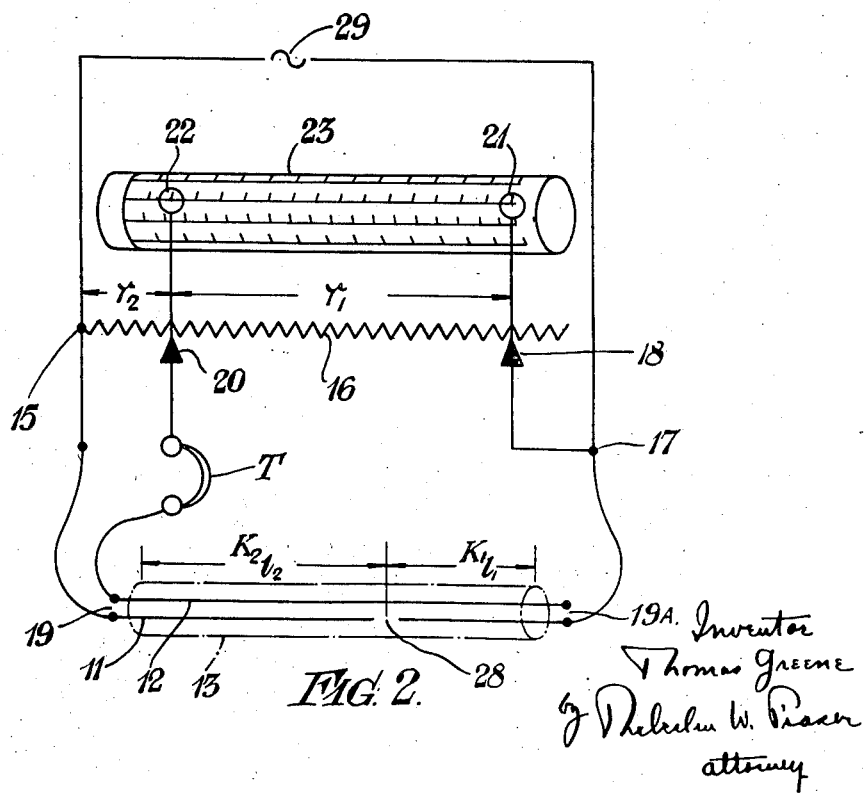
Figure 3:
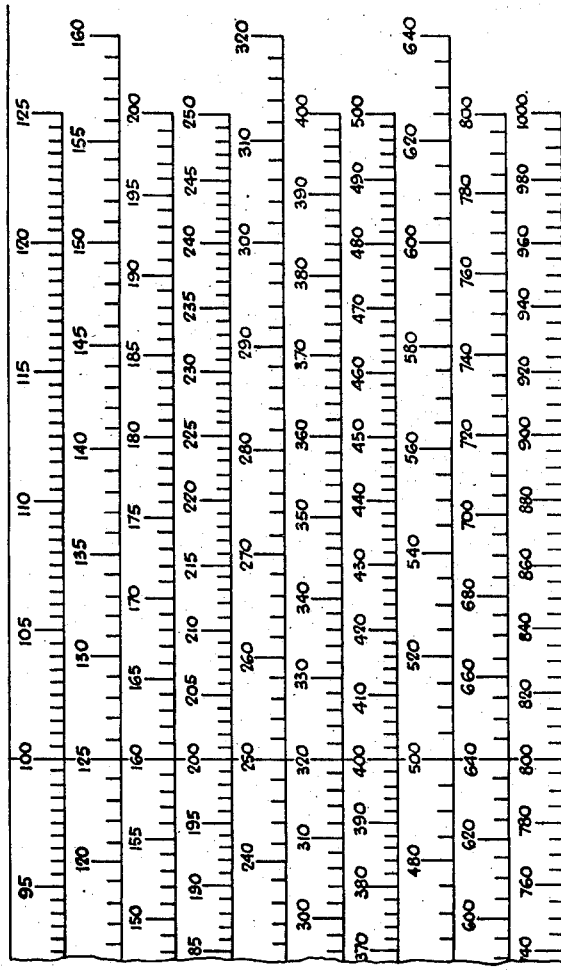
Figure 3:
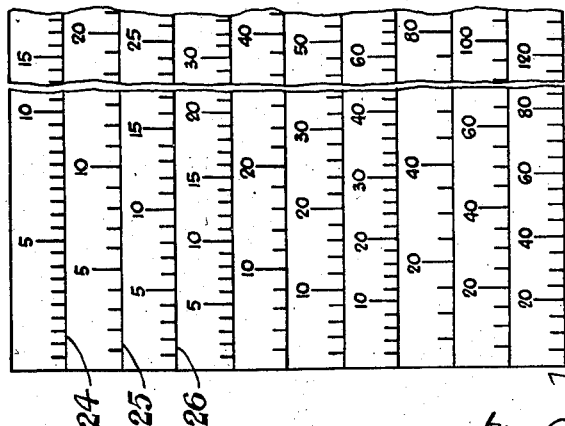

Two preferred forms of the invention will now be described with reference to the accompanying diagrammatic drawings, in which:

Figure 1 is a circuit diagram illustrating apparatus for detecting a short circuit in a length of twin cable, Figure 2 is a circuit diagram illustrating the same apparatus but set to locate a break in one cable of a length of twin cable, and Figure 3 shows a scale, when laid out flat, which is used in cylindrical form in the apparatus of Figures 1 and 2.

The various parts shown for analytical purposes separately in the three figures are, in practice, incorporated in one piece of apparatus. It will be seen that Figures 1 and 2 will differ in their parts only in that a galvanometer G of Figure 1 is replaced in Figure 2 by a telephone T. The replacement may, however, in practice be effected by a switch which is not shown but is incorporated in the one apparatus.

When the apparatus is set in the position of Figure 1 it may be used to locate the position of a short circuit occurring at 10 between the cables 11, 12 of a twin cable which, it is assumed, is inaccessibly placed in a covering indicated by 13. Such a problem occurs, for example, in connection with covered telephone wires of considerable length buried in the ground, successful location of the position of the fault avoiding the necessity of taking up the whole wire.

The apparatus comprises a source of direct current 14, one terminal of which is connected at 15 to one end of a potentiometer resistance 16 and the other terminal of which is connected at 17 to an end-contact 18 slidable over the other end of the potentiometer.

One wire 12 of the twin cable to be tested is connected as shown in parallel with the length 15, 18 of potentiometer wire and one end 19

2 of the other wire 11 is connected through a galvanometer G to an intermediate-contact 20 slidable over the whole length of the potentiometer wire.

The contacts 18 and 20 are integral with, or mechanically coupled to, a pair of pointers 21 and 22 respectively which, when the contacts 18 or 20 are moved, slide over a cylindrical scale-holder indicated generally at 23 in the figures and shown in greater detail in Figure 3, developed on a flat plane.

It will be seen from Figure 3 that the scale-holder 23 carries a plurality of separate scales such as 24, 25, 26 etc., each of uniform graduation, but each succeeding one being less open than the preceding one. The composite scale so formed is ringed at 27 by a line passing through the unit 100 on the uppermost scale, which is the most open one.

The potentiometer resistance 16 is divided by the intermediate contact, into two resistances $r1$ and $r2$ which thus constitute the series-connected known ratio-arms of the Wheatstone bridge, whilst the short circuit 10 divides the cable under test into two series-connected resistance the values of which can be found with the bridge.

The branch of the bridge containing the galvanometer or other testing instrument is called herein the transverse branch of the Wheatstone bridge. The end-contact 18 is movable only over a minor end-portion of the resistance 16 in such manner as to determine the total length of resistance brought into use, whilst the intermediate contact 20 moves over a major portion of the resistance 16 and determine the proportion into which the series resistances $r1$ and $r2$ are divided.

The expressions "major" and "minor" portions of the resistance 16 or scale-holder 23 are intended to indicate respectively more and less than half the resistance or length of holder, but preferably the portion between the major and minor portions is about 4/1".

Let it be assumed that the length (19, 19A) of the twin cable 11, 12 is 120 yards.

In order to find the position of the short circuit 10, the end-contact 18 is set at the number 120 on the scale 24, thus limiting the length of potentiometer resistance brought into use to 120 units. The galvanometer G and source of current 14 are then switched on and the intermediate contact 20 is moved until zero current flows through the galvanometer G.

Let the resistance between 15 and 20 = $r_1$
Let the resistance between 20 and 18 = $r_2$
Let the resistance between 19 and 10 = $R_1$
Let the resistance between 10 and 19A = $R_2$
Let the distance between 19 and 10 = $l_1$
And the distance between 10 and 19A = $l_2$
Then $$\frac{r_1}{r_2} = \frac{R_1}{R_2} = \frac{l_1}{l_2}$$

so that the position of pointer 22 on the scale 24 gives a direct reading of the position of the short-circuit along the length of cable.

The method so far described of locating the position of a fault is known.

Suppose, however, it is now required to find a short circuit along a twin cable 180 yards long. The same apparatus of the present invention can be used merely by rotating the scale holder 23 to bring scale 26 under the pointers 21 and 22, and in this respect the present apparatus possesses great advantage over the known apparatus which required comparatively laborious changes and calculations to make the second investigation.

In order to make the second test, with the present novel device, after scale 26 has been brought under the pointers, the end pointer 21 is set at reading 180 along this scale and thereafter the apparatus is operated as before to give zero reading in the galvanometer. In this position the intermediate pointer 22 gives on scale 26 a direct reading of the position of the short circuit, no calculation whatever being necessary.

It will be seen, by inspection of Figure 3, that any one of the scales could be used to take measurements on cables of under 125 units long. Clearly, however, measurements should always be taken on the most open scale, in order to give the greatest accuracy. Thus cables of up to 125 units long should be measured on scale 24, cables of between 125 and 160 units should be made on scale 25, cables of between 160 and 200 units should be measured on scale 26, and so on for the other scales.

In order to ensure that the operator always selects the most open scale a stop (not shown) is therefore placed against end-contact 21 preventing it moving to the left of the line 27.

In order to use the same instrument to find a break 28 in the twin cable, a switch is brought into use which cuts out the galvanometer G and replaces it with a pair of head telephones T, so that the circuit arrived at is that illustrated in Figure 2. If desired the same switch may replace the source of direct current 14 of Figure 1 with a source of alternating current 29 (Figure 3) or interrupted direct current.

In order to find the break, the end-pointer 21 is set, on the appropriate scale, to the length of the cable, the cable is connected to the instrument as shown in Figure 2 and intermediate-contact 22 is moved until minimum sound is heard in the telephone T.

In this position, assuming the capacities of the two parts $l_1$ and $l_2$ of the cable to be represented by $K_1$ and $K_2$ respectively, we have, $$\frac{r_1}{r_2} = \frac{K_2}{K_1} = \frac{l_2}{l_1}$$

so that, as in the last case, the position of the break may be read off, without any calculation whatsoever, on the scale.

An important feature of the apparatus is that the scales 24, 25, 26 etc., are so selected that the whole, or nearly the whole, of the length of the potentiometer resistance 16 may be used to correspond with the length of the cable under test, no matter what the length of the cable may be. The several scales need not be rectilinearly arranged and the pointers 21 and 22 may, if desired, be geared to the contacts 18 and 22, but the movement of the pointers must be proportional to that of the contacts.

It will be seen that the two types of faults referred to above are located by methods involving the comparison of resistances (Figure 1) and capacities (Figure 2) respectively.

If, however, one of the compared resistances or capacities is known, then the other can be found in absolute measure.

The apparatus may therefore be used for locating faults and measuring or comparing resistances and capacities.

I claim:

1. Apparatus for measuring and comparing resistances and capacities, for example locating faults in cables and the like, comprising a Wheatstone bridge two of the series-connected arms of which are comprised by a potentiometer resistance, a scale-holder carrying a plurality of scales, an end-contact slidable over a minor end-portion of the potentiometer resistance so as to vary the total length of the potentiometer, an end-pointer coupled to the end-contact and movable over the holder, an intermediate-contact at one end of the transverse line of the bridge slidable over a major portion of the resistance so as to vary the proportion of the resistance in the two series-connected arms constituted by the potentiometer resistance, an intermediate-pointer coupled to the intermediate-contact and movable over the holder, terminals connected respectively with one end of the potentiometer resistance, the end-contact and intermediate contact whereby the element to be tested can be connected so as to constitute the other two series-connected arms of the bridge, and means for producing relative movement between the holder and the pointers so that any one of the scales on the holder can be brought under the pointers, wherein the scale-holder bears a plurality of parallel scales each having zero number at its left-hand end and at its right-hand end a number which is repeated on another scale at a position between the mid-point and right-hand end of the latter scale.

2. Apparatus as claimed in claim 1 wherein the holder bears a plurality of parallel scales all of uniform gradation and so related and positioned on the holder that there can be drawn through the scales a circular line dividing each scale into major and minor portions and at which line is located, on each scale, the highest unit recorded on an adjacent scale.

3. Apparatus as claimed in claim 1, wherein there is provided a stop confining the end-pointer to the minor portions of the scales.

THOMAS GREENE.

REFERENCES CITED

The following references are of record in the file of this patent:

UNITED STATES PATENTS

| Number | Name | Date |
|---|---|---|
| 754,402 | Wiseman | Mar. 8, 1904 |
| 2,101,296 | Simpson et al. | Dec. 7, 1937 |
| 2,154,066 | De Giers | Apr. 11, 1939 |